April 21, 1936. G. HULTBERG 2,037,788
PROCESS AND APPARATUS FOR PRODUCING VARIEGATED ROOFING
Filed Aug. 26, 1933 2 Sheets-Sheet 1

INVENTOR
Gottfried Hultberg
BY
ATTORNEY

April 21, 1936.　　　　G. HULTBERG　　　　2,037,788
PROCESS AND APPARATUS FOR PRODUCING VARIEGATED ROOFING
Filed Aug. 26, 1933　　　　2 Sheets-Sheet 2
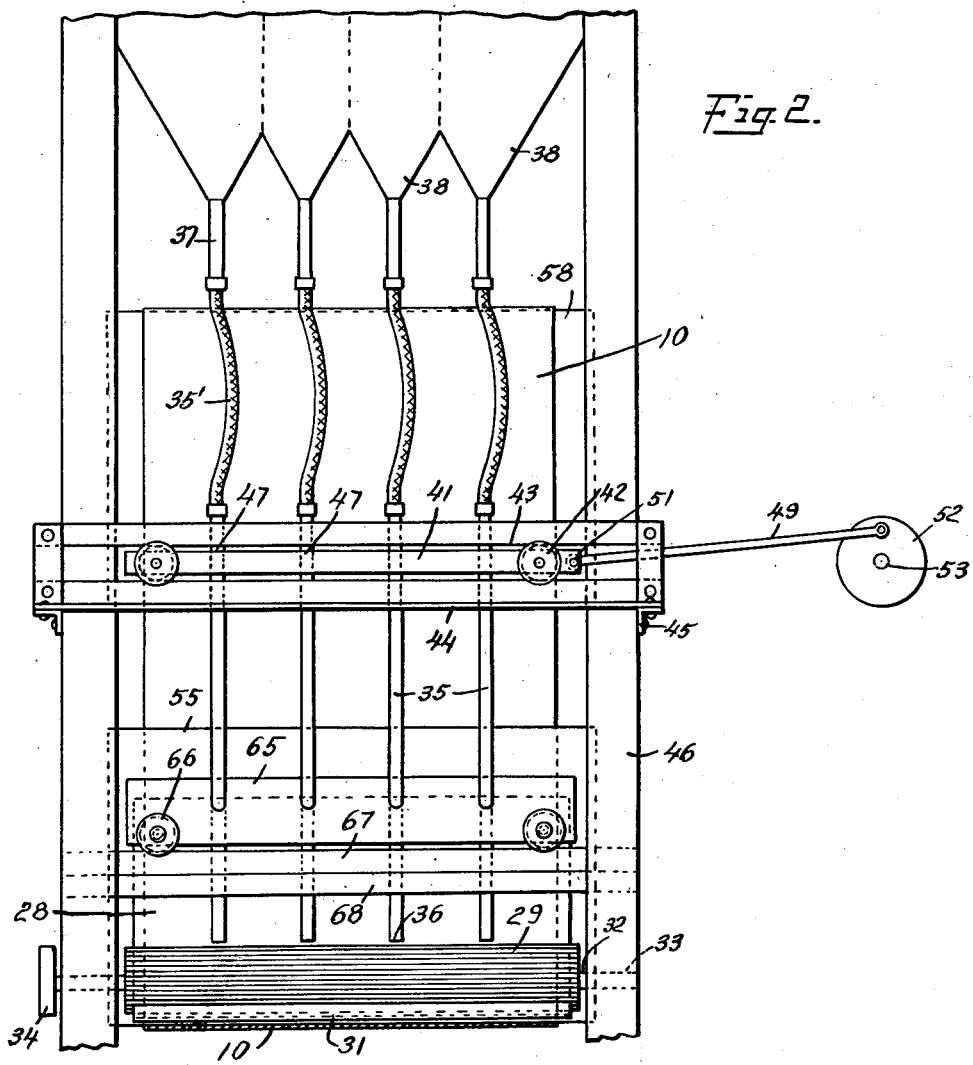
Fig. 2.
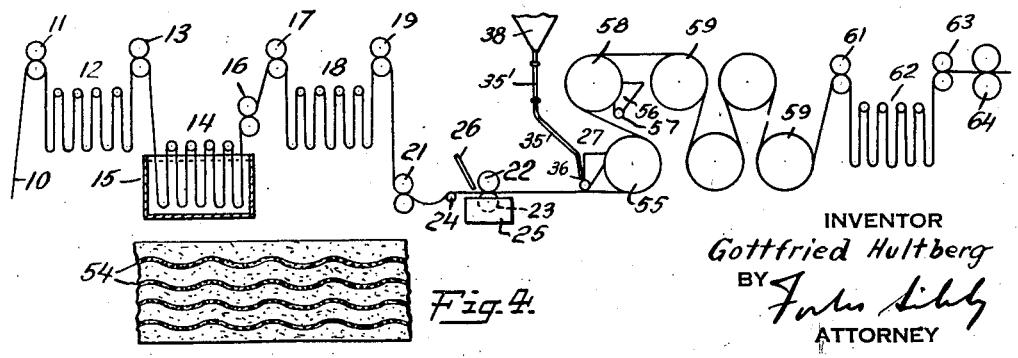
Fig. 3.
Fig. 4.
INVENTOR
Gottfried Hultberg
BY
ATTORNEY Patented Apr. 21, 1936

2,037,788

UNITED STATES PATENT OFFICE 2,037,788

PROCESS AND APPARATUS FOR PRODUCING VARIEGATED ROOFING

Gottfried Hultberg, Chicago, Ill., assignor to The Barrett Company, New York, N. Y., a corporation of New Jersey Application August 26, 1933, Serial No. 686,921

7 Claims. (Cl. 91—43)

This invention relates to roofing, and more particularly, to the surfacing of roofing with differently colored granular material to produce roofing presenting a variegated appearance. The term "roofing" is used herein in a broad sense and is intended to include not only the usual felt base composition roofing, whether employed for covering roofs, walls, or other surfaces, but also other covering material, such as that made from a mastic or adhesive composition and adapted to be surfaced with granular material.

It has been proposed to surface roofing by applying contiguous longitudinal parallel stripes or bands of differently colored granular material to a roofing sheet. To create wavy stripes on the roofing sheet, the hopper from which the granular material was fed onto the sheet was reciprocated transversely of the direction of movement of the sheet. To get away from the monotonous regularity of such striped sheets, it has been suggested that granular material be applied in two steps, the granular material applied during the first step covering selected areas and granules of a contrasting color applied during the second step covering the entire sheet, including the portions of the sheet covered in the first step. Such procedure, it will be appreciated, involves the excessive handling and waste of granular material. Furthermore, considerable excess of granular material of different colors is applied. This must be removed from the sheet and recovered. It is difficult and requires a complicated mechanical layout to recover such excess granules without mixing the colors and the resultant irregular blend is of diminished value for surfacing.

It has also been proposed to simultaneously apply to a roofing sheet two streams of granular material, each stream of a width sufficient to completely cover the sheet. One stream was fed from a hopper having partitions dividing it into compartments containing differently colored granular material so that a striped effect was produced. The other stream was fed from a hopper containing a solid color of granular material which blended with and masked to some extent the color of the stripes produced by the granular material fed from the first-mentioned hopper. Such procedure also involves excessive handling and waste of granular material.

It is an object of this invention to provide a one-step surfacing procedure producing variegated roofing, which procedure, as compared with heretofore existing surfacing processes, minimizes the handling of the granular material. In accordance with this invention, a continuously moving roofing web is surfaced to produce a pleasing variegated effect by moving the sheet under a rotating distributor roll which receives on its circumferential surface granular material of one color from a hopper in which the roll is mounted. A plurality of spaced wavy streams of granular material of a contrasting color are superimposed on the granular material on the circumferential surface of the roll. The resultant mixture of granules is discharged by the rotation of the roll onto the moving sheet, producing the desired multicolor or variegated surfaced roofing.

Another object of this invention is to provide apparatus comparatively simple in design and efficient in operation for practicing such procedure.

Other objects and advantages of this invention will be apparent from the following detailed description, taken in connection with the accompanying drawings, in which—

Fig. 2 is a front elevation, partly in section, of the apparatus of Fig. 1;

Fig. 3 is a side elevation, somewhat diagrammatic in character, showing equipment for making composition roofing; and Fig. 4 is a fragmentary plan view of roofing surfaced in accordance with this invention.

Figure 1:
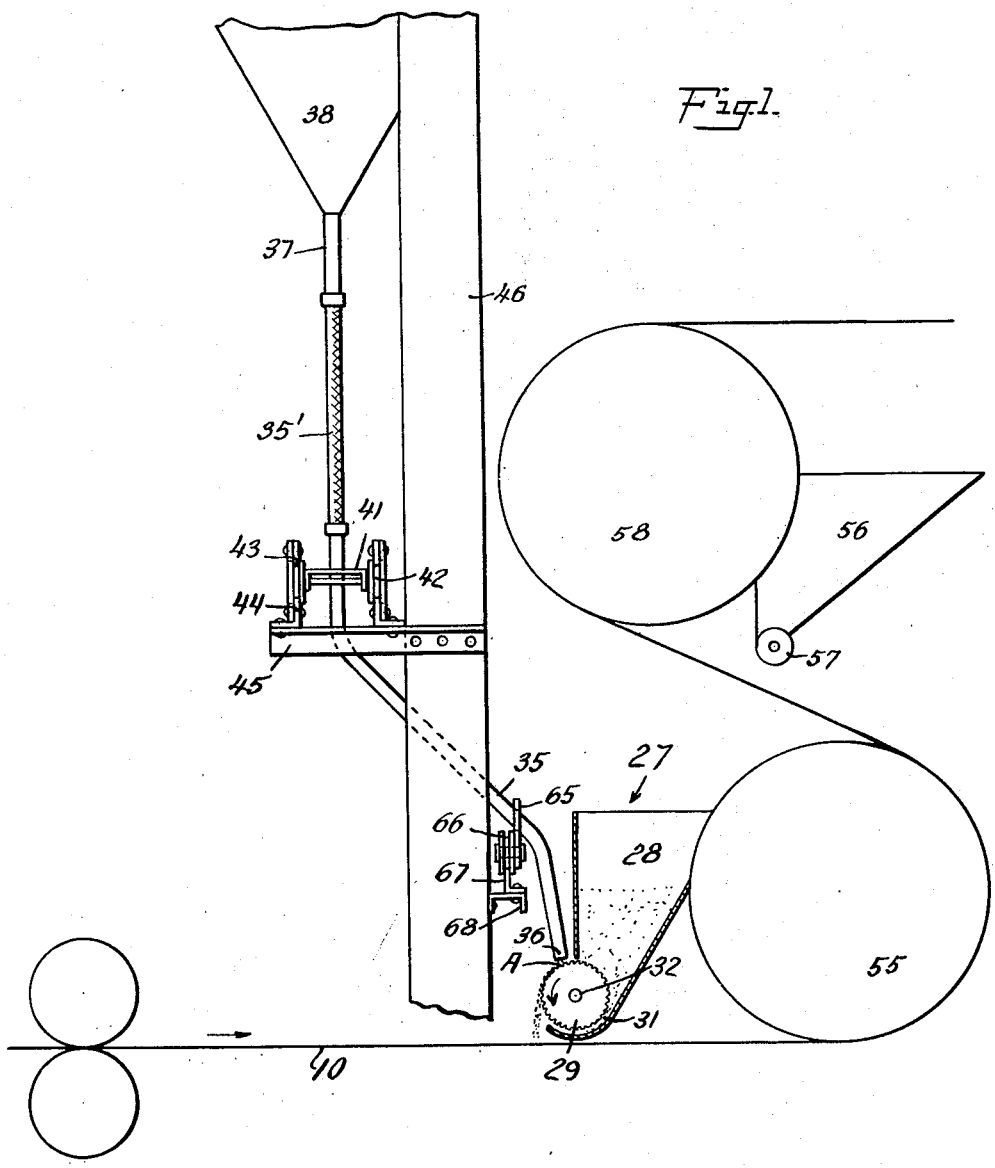
Fig. 1 is a vertical section, partly in elevation, through surfacing apparatus embodying this invention.

Referring to the drawings, with particular reference to Fig. 3, a sheet of fibrous material 10, which may be, and preferably is, of the usual roofing felt made of rag fiber, paper stock, or other fibrous material, with or without suitable fillers, as well known in the roofing art, is fed by feed rolls 11 from the usual paper making machine or felt roll into a looping device 12. From this looping device, rolls 13 feed the sheet into any suitable type of saturating apparatus indicated generally by the reference numeral 14. Saturating tank 15 may contain suitable cementitious waterproofing composition, such as asphalt or other bituminous material utilized for the impregnation and saturation of roofing felts.

Feed rolls 16 and 17 feed the saturated sheet to a second looping device 18. The passage of the saturated fibrous sheet or base through the looping device 18 gives the saturant an opportunity to dry and to impregnate the base thoroughly. Feed rolls 19 and 21 feed the saturated sheet from the looping device 18 to the coating apparatus involving a pair of coating rolls 22, 23. Feed rolls 21 are preferably driven at a slightly greater peripheral speed than the coating rolls 22, 23, slack accumulating between the driven rolls 21 and the guide roll 24, over which the sheet passes before entering the bite of the coating rolls 22, 23. Coating roll 23 is rotatably mounted in a tank 25 which may contain bituminous material, such as asphalt or other cementitious waterproofing substance suitable for coating roofing felt. Bituminous material, such as asphalt, may be applied to the top of the sheet by means of a pipe 26 having a spout of a width approximately equal to that of the sheet. As the sheet passes between the coating rolls 22, 23, the underside is completely coated by roll 23. The coating material delivered by pipe 26 is spread uniformly over the top side of the sheet by the coating roll 22, excess coating material passing over the edges of the sheet and draining into the tank 25.

Immediately after leaving the coating rolls 22, 23, and while the coating material is still soft and tacky, the coated sheet passes under the surfacing apparatus indicated generally by the reference numeral 27. This surfacing apparatus comprises a hopper 28, preferably of a length equal to the width of the roofing sheet 10. A distributing roll 29 is rotatably mounted in the discharge outlet 31 of hopper 28. This roll is so disposed in the discharge outlet that a portion of the circumferential surface thereof extends exteriorly of the hopper, as clearly appears from Fig. 1. Shaft 32 of the distributor roll 29 is rotatably mounted in suitable bearing supports 33 (Fig. 2) and has keyed thereon a pulley 34 arranged to be belted to a suitable source of power for driving the roll 29. This roll may, of course, be driven by any other suitable mechanism.

A plurality of oscillating hoses 35 are disposed with their discharge outlets 36 arranged to deliver granular material on the circumferential surface of roll 29 extending exteriorly of hopper 28. Hoses or pipes 35 are preferably made of metal and connect with hose sections 35' made of flexible material, such as rubber hose. The sections 35' are each connected to a rigid pipe section 37 integral with or connected to the hopper 38. In the embodiment of the invention shown on Fig. 2, four hoses 35 are shown communicating with pipe sections 36, which in turn communicate with the hoppers 38. Granular material, such as crushed rock, slate, or other mineral material of one color, degree of coarseness or other characteristics, is supplied to hoppers 38 and granular material of a different color, degree of coarseness or other characteristics is supplied to hopper 28. If desired, granules of contrasting colors may be supplied to the different hoppers 38 communicating with the hoses 35.

Simultaneous oscillation of the hoses 35 is effected by the mechanism hereinafter described. This mechanism, in one form, involves a carriage 41 provided with wheels 42 on both sides thereof, as appears from Fig. 1. The wheels travel in the guide slots 43 in a pair of side members 44 riveted or otherwise secured to arms 45. The arms 45 are suitably riveted to the standards 46. The hose sections 35 pass through openings 47 in carriage 41 so that as the carriage is reciprocated, the hose sections move therewith. The carriage may be reciprocated by a link 49 having one end pivoted as at 51 to the carriage and the other end secured to a disc or crank 52 keyed on rotating shaft 53. Rotation of shaft 53, it will be understood, through the link 49 will effect reciprocation of the carriage 41. Movement of the hoses 35 is guided by a frame 65 through which the hoses extend. This frame is provided with wheels 66 arranged to travel on a track 67, carried by channel bars 68 riveted to standards 46.

In operation, grit of one color or other characteristics will be deposited on the circumferential surfaces of the fluted roll 29 and as the roll rotates, carried thereby exteriorly of the hopper 28 to the point indicated by the reference character A. Spaced wavy streams of granular material of a different color or degree of coarseness will be deposited on the granules, covering the surface of roll 29 at the point A from the oscillating hoses 35. Simultaneous oscillation of the hoses will be effected by rotation of shaft 53 as hereinabove described and due to the oscillation of the hoses, streams fed therefrom will be of wavy contour. Rotation of roll 29 causes the resultant mixture of granules thereon to be showered therefrom onto the coated web 10 forming wavy stripes or bands 54 (Fig. 4) constituted of a blend of granules.

After being surfaced as hereinabove described, the surfaced sheet passes about a reversing roll 55, which functions to partially embed the mineral granules in the plastic coating. Any excess grit falls from the surfaced sheet into the hopper 28. If desired, a separate hopper may be provided above hopper 28 to receive the granules falling off from the surfaced sheet. In the continued passage of the surfaced sheet, it travels next under a hopper 56. Powdered talc, mica, or other anti-stick composition capable of rendering the back of the sheet non-adhesive is disposed in hopper 56 and discharged therefrom by rotating distributing roll 57 onto the back of the sheet in the form of a talc surfacing layer covering substantially the entire width of the sheet. The talc covered sheet then passes over reversing roll 58, which partially embeds the talc in the sealback coating and imparts a smooth surface to the back of the sheet. Excess talc falls from the sheet as it passes from reversing roll 58 to the first of a series of calender rolls 59. From the last of the calender rolls 59, the resultant roofing sheet may be fed by feed roll 61 through looping device 62 where the coated and surfaced product is given an opportunity to cool. Feed roll 63 feeds the surfaced sheet into a winding machine (not shown) where it may be wound into rolls which are shipped or used as the desired roll roofing product. Feed rolls 63, if desired, may feed the surfaced sheet into cutting cylinders 64 for cutting the sheet into individual strip shingles.

Distributing roll 29 may be driven from any suitable source of power such as an electric motor (not shown). Preferably, however, the drive for roll 29 is geared to that for rolls or drums 58 and 59, which pull the sheet through the apparatus so that the speed of rotation of roll 29, and consequently the velocity of the grit discharged by this roll onto the sheet, are proportional to the speed of movement of the sheet through the apparatus.

Since certain changes in carrying out the above process and certain modifications of the apparatus may be made without departing from the scope of this invention, it is intended that all matter contained in the above description or shown in the accompanying drawings shall be interpreted as illustrative and not in a limiting sense.

I claim:

1. Surfacing apparatus comprising, in combination, a hopper containing granular material, a distributor roll located in a discharge outlet of said hopper and arranged to discharge said granular material from said hopper, and an oscillating pipe arranged to deposit other granular material onto granular material on said distributor roll.

2. Surfacing apparatus comprising, in combination, a hopper containing granular material, a distributor roll rotatably mounted in the discharge outlet of said hopper and having a portion of the circumferential surface thereof extending exteriorly of said hopper and arranged to be rotated so that granular material deposited on the circumferential surface thereof is discharged therefrom onto a roofing web, and means for depositing other granular material on the granular material on the circumferential surface of said roll.

3. Surfacing apparatus comprising, in combination, a hopper containing granular material, a distributor roll rotatably mounted in the discharge outlet of said hopper and having a portion of the circumferential surface thereof extending exteriorly of said hopper and arranged to be rotated so that granular material deposited on the circumferential surface thereof is discharged therefrom onto a roofing web, a plurality of oscillating hoses arranged to discharge other granular material on said granular material on the circumferential surface of said roll, and means for oscillating said hoses.

4. Surfacing apparatus comprising, in combination, a hopper of a width equal to that of a coated sheet passing therebeneath, a distributing roll rotatably mounted in the discharge outlet of said hopper having a portion of the circumferential surface thereof extending exteriorly of said hopper, said distributing roll being arranged to receive granular material in said hopper on the circumferential surface thereof and discharge the same onto a roofing web passing therebeneath, a plurality of spaced oscillating hoses disposed to discharge other granular material onto the granular material on the circumferential surface of said roll, and means for simultaneously oscillating the spaced hoses.

5. Surfacing apparatus comprising, in combination, means for maintaining a bulk supply of granular material, a moving support in proximity to said bulk supply and in contact with the material of said supply, means for continuously moving said support to remove a layer of granular material from said supply, said layer being carried by said moving support, means for continuously superimposing on said layer of granular material on said support, granular material of a different characteristic, and means for moving said support to discharge therefrom the mixture of granules thereon.

6. The process of surfacing roofing, which comprises, maintaining a bulk supply of granular material, continuously removing granular material from the bulk supply by a rotating support moving in contact with the bulk supply to form a layer of granular material on the rotating support, continuously superimposing on the layer of granular material on the rotating support spaced wavy streams of granular material of different characteristics from the granular material constituting the said layer and continuously rotating the support to deposit the resultant mixture of granules on a moving sheet.

7. The process of surfacing roofing which comprises maintaining a bulk supply of granular material, continuously removing granular material from the bulk supply by rotating a support to form a layer of granular material on the rotating support, continuously superimposing on the layer of granular material on the support a stream of granular material of different characteristics from the granular material constituting said layer and continuously rotating the support to deposit the resultant mixture of granules on a moving roofing sheet.

GOTTFRIED HULTBERG.